United States Patent [19]

Young

[11] 3,932,956
[45] Jan. 20, 1976

[54] TOY VEHICLE CLUTCH
[75] Inventor: Edmund Young, West, Hong Kong
[73] Assignee: Ideal Toy Corporation, Hollis, N.Y.
[22] Filed: Jan. 8, 1975
[21] Appl. No.: 539,370

[52] U.S. Cl. .................................. 46/202; 64/30 D
[51] Int. Cl.² ......................................... A63H 29/00
[58] Field of Search ........ 46/202, 206; 64/28 R, 29, 64/30 D

[56] References Cited
UNITED STATES PATENTS

| 2,564,605 | 8/1951 | Martin | 64/30 D |
| 2,907,190 | 10/1959 | Pastor | 64/30 D |

FOREIGN PATENTS OR APPLICATIONS

| 850,903 | 10/1960 | United Kingdom | 46/202 |

Primary Examiner—Louis G. Mancene
Assistant Examiner—Robert F. Cutting
Attorney, Agent, or Firm—Richard M. Rabkin, Esq.

[57] ABSTRACT

In a toy vehicle having a plurality of ground engageable wheels and drive means having a drive shaft operatively engaged with at least one of the wheels, a clutch is provided in the driven wheel in order to protect the drive means against damage should the wheel be stopped while the drive means is in operation. The clutch comprises a first clutch element secured to the drive means for rotation therewith and a second clutch element having an inner surface peripherally surrounding the first clutch element. One of the clutch elements has a plurality of radially extending teeth formed thereon and the other of the clutch elements has at least one detent dimensioned to fit between two adjacent teeth in order to provide the driving connection for transmitting power from the motor to the second clutch element in order to drive the wheel. Should the wheel be stopped while the drive motor is in operation, the teeth flex over the detent in order to permit relative rotation between the clutch elements, allowing the motor and drive elements to rotate even while the drive wheel is stopped.

12 Claims, 3 Drawing Figures

TOY VEHICLE CLUTCH

The present invention relates to toy vehicles, and more particularly to a clutch mechanism for a powered toy vehicle, which clutch is adapted to protect the motor and drive train of the vehicle from damage.

Numerous types of toy vehicles are presently available in which a drive mechanism is provided in order that the vehicles be self-propelled. Many of such vehicles include flywheel motors in which a flywheel or inertia element is rotated at a relatively high speed in order to produce the driving power for the vehicle. One such flywheel arrangement, using a relatively high gear reduction ratio whereby the relatively heavy flywheel rotates at extremely high speeds, is disclosed in U.S. patent application Ser. No. 442,490 filed Feb. 14, 1974.

In toy vehicles driven by a flywheel motor or other type of drive mechanisms, damage to the motor or gears in the drive arrangement can occur if the child playing with the toy rapidly stops rotation of the drive wheel when the motor is operating at high speed. This can occur, for example, in a flywheel driven apparatus when, after the vehicle's flywheel has been energized to a high rotational velocity, the child places the vehicle forcefully on a play surface so that the driven wheels, in effect, are stopped from rotating. However, since the flywheel continues to rotate due to its inertia, it is possible that the gears of the drive train connecting the flywheel to the drive wheel could be stripped.

Accordingly, it is an object of the present invention to provide a toy vehicle having a clutch arrangement which is adapted to protect the drive train of the vehicle.

Yet another object of the present invention is to provide a clutch mechanism for a toy vehicle which will protect the drive of the vehicle during operation.

Another object of the present invention is to provide a toy vehicle having a flywheel type inertia motor with a clutch arrangement that will protect the flywheel motor and gear train when the driven wheels of the vehicle are stopped.

Yet another object of the present invention is to provide a toy vehicle which is durable in construction and economical in manufacture.

In accordance with an aspect of the present invention a toy vehicle is provided which has a plurality of ground engageable wheels and a flywheel type motor that is operative to drive a shaft connected with at least one of the vehicle's wheels in order to propel the vehicle along a play surface. A clutch is formed in the drive wheel in order to protect the gear train of the drive mechanism. This clutch comprises a first clutch element which is fixed to the drive shaft for rotation therewith and a clutch element that is freely rotatable mounted on the drive shaft and forms part of the drive wheel. The second clutch element has a cavity formed therein which receives and peripherally surrounds the first clutch element. One of the two clutch elements has a plurality of radially extending gear type teeth formed thereon, while the other of the clutch elements has a projection or detent formed thereon which is dimensioned to fit between two adjacent gear teeth, thereby to provide the driving connection between the clutch elements for transmitting power from the motor to the second clutch element and the drive wheel. The gear teeth used in the clutch are formed of a material having aa predetermined flexibility relative to the detent, so that the teeth will flex over the detent to allow the clutch elements to rotate with respect to one another when the driven wheel is stopped while the drive means is in operation in either direction of rotation. In this manner, should the drive wheel be stopped while the motor is in operation, the gear train in the vehicle will be protected.

The above, and other objects, features and advantages of the invention will become apparent in the following detailed description of an illustrative embodiment thereof, which is to be read in connection with the accompanying drawings, wherein.

Figure 1:
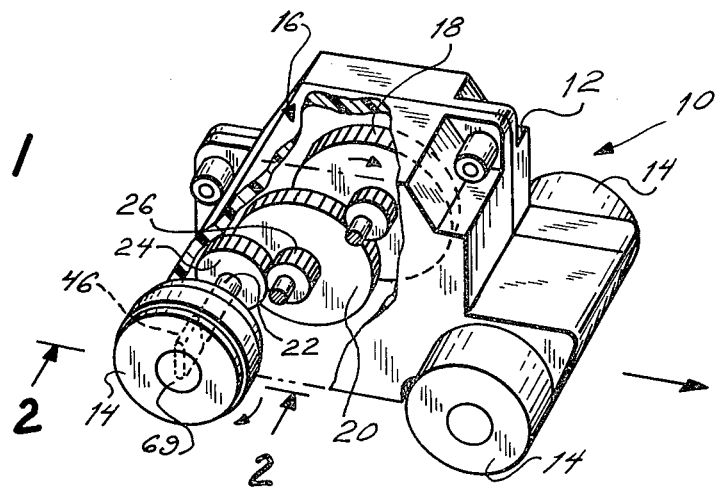
FIG. 1 is a perspective view, with parts broken away, of a toy vehicle constructed in accordance with the present invention.

As seen in FIG. 1, a toy vehicle 10, constructed in accordance with the present invention, includes a body 12 and a plurality of ground engageable wheels 14 rotatably mounted thereon. A flywheel motor 16 is mounted in the vehicle body 12, in any convenient manner. As mentioned, this motor may be of the type described in U.S. Pat. application Ser. No. 442,490 filed Feb. 14, 1974, and includes a relatively heavy flywheel 18 connected through a gear reducing train 20, to an output shaft 22. The latter may extend entirely across the body 12, so as to supply motive power to both of the rear wheels (only one of which is seen in FIG. 1).

In operation vehicle 10 is held by the child and the rear wheels are rolled along the play surface or floor, in order to transmit rotary energy through the gear train 20 to the flywheel 18. After the vehicle has been rapidly moved on the floor a series of times, and the flywheel 18 is rotated to the desired speed, the child simply places the vehicle on the floor and the flywheel 18, which now has kinetic energy stored therein, will transmit that energy back through the gear train to the rear drive wheels 14 in order to propel the vehicle. Of course, the direction of propulsion of the vehicle depends upon the direction in which the vehicle has been moved by the child in energizing the flywheel.

With this arrangement, it may occur that when the child finally energizes the flywheel to the desired speed and places it on the floor or play surface, he may hold the vehicle down with sufficient force so that the rotation of the rear drive wheels 14 is stopped. Should this occur, the shaft 22 and the gears connected thereto are also stopped and held against rotation. However, the flywheel 18 is continuously rotating so that the gears, e.g. gears 24 and 26, will jam against each other, creating the possibility that the gear teeth thereon will break.

Figure 2:
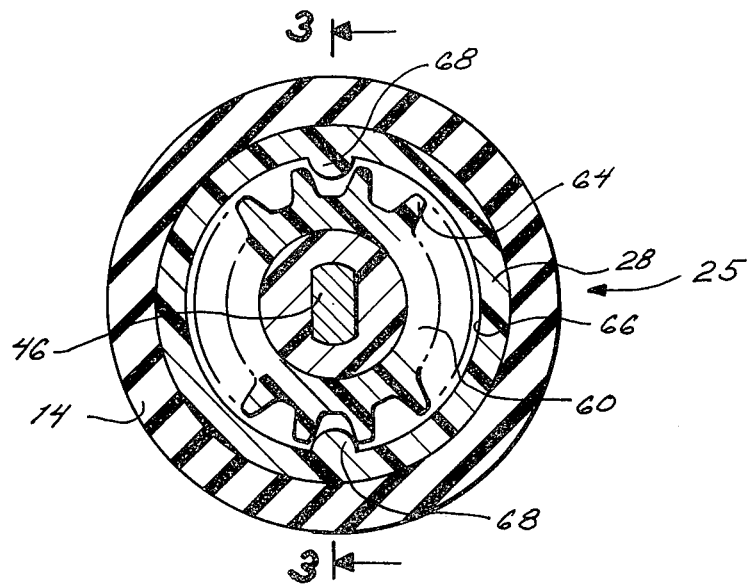
FIG. 2 is a sectional view taken along line 2—2 of FIG. 1.
Figure 3:
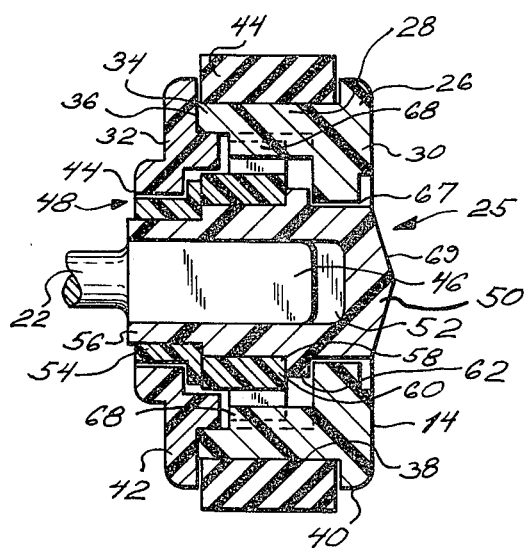
FIG. 3 is a sectional view taken along line 3—3 of FIG. 2.

In order to avoid this possibility and to protect the entire flywheel motor against damage, the rear drive wheels 14 of the vehicle 10 are each provided with a clutch arrangement 25, constructed in accordance with the present invention, which forms an integral part of each of the rear drive wheels. More specifically, as seen in FIGS. 2 and 3, each drive wheel 14 includes an outer cap or section 26 which is formed generally as a cup shaped element having a peripheral annular wall 28 and a base 30. The opposite side of the wheel 14 is provided by a second cap element 32 that is sonically welded to the free end 34 of annular wall 28, at the point of engagement therebetween 36 (see FIG. 3). These caps preferably are formed of a hard plastic material such as ABS. The caps 26 and 32 form substantially the entire wheel, with the cap 26 having an outer annular surface portion 38 that is recessed with respect to the edges 40 and 42 of the caps 26 and 32. An elastic endless band 44 can be placed in this annular recess or groove to provide the ground engaging surface for the wheel 14.

The base or cap 32 has a centrally located opening 44 therein through which the shaft 22 of the motor 16 extends. The free end 46 of shaft 22 (each end of the shaft 22 is of identical construction so that only one end is illustrated in the drawings) has a generally rectangular or polygonal configuration (see FIG. 2). The rectangular configuration of the shaft allows the shaft to be rigidly connected to one of the clutch elements 48 in the clutch assembly 25.

The clutch element 48 includes a bushing 50 having a generally rectangular opening 52 formed therein which frictionally engages the end 46 of the shaft for rotation therewith. A sleeve 54 surrounds the end portion 56 of bushing 50, as seen in FIG. 3, to define an annular channel or recess 58 about the periphery of the sleeve 50. An annular gear 60 is mounted in this recess (see FIG. 2) and is held in place against the shoulder portion 62 of the bushing 50 by the sleeve 54. If desired all of these elements may be sonically welded together to form an integral one piece clutch element. Alternatively, the entire assembly of the clutch element 48 can be formed as a one piece member. However, it is contemplated that if the various elements 50, 54 and 60 are formed with close tolerances, the friction fit therebetween will be sufficient to maintain the elements in tight assembly. Similarly, the rectangular opening 52 in the bushing 50 is sufficient to provide the desired fit for the clutch element to the end of the shaft 22 and form the driving connection therebetween. However, if the shaft is formed of a plastic material these elements can also be sonically welded together. Alternatively, any suitable adhesive or locking arrangement between the end of the shaft and the clutch element 48 can be used.

The gear 60 has a plurality of radially extending teeth 64 formed thereon about its entire periphery. These teeth extend outwardly, towards the inner surface 66 of the annular wall 28 of cap 26. This surface 66 has a pair of diametrically opposed detents 68 formed thereon which are dimensioned to be received in the spaces between the teeth 64 of the gear 60. Under normal operating conditions, the arrangement of the detents 68 between the teeth 64 provides a driving connection between the clutch element 48 and the cap 26; the latter thus forms the second clutch element of the clutch assembly. Accordingly, rotation of the shaft 22 will cause clutch element 48 to rotate, and the engagement of the detent 68 between the teeth 64 will in turn cause the cap 26 and thus the drive wheel to rotate.

In accordance with a feature of the present invention the gear 60 is formed of a material which has a predetermined flexibility with respect to the detent 60. For example, the gear 60 can be formed of a polyurethane material, while the cap 26 and integral detent 68 can be formed of a somewhat harder ABS plastic. By this arrangement, should the drive wheel 14 of the vehicle be stopped while the flywheel motor 18 is still in operation, the drive to the shaft 22 will cause the gear 60 to rotate with respect to the stopped cap 26. The flexible teeth 64 will then snap over the detents 68, so that the clutch elements will rotate with respect to one another. In this manner, the gears in the gear train of the flywheel motor can continue to rotate so that they are not broken by stoppage of the drive wheels. The flexible material of which the gear or clutch element 60 is formed, will allow the shaft 22 to continue to rotate until the energy of the flywheel 18 has been dissipated. On the other hand, when the rear wheels 14 of the vehicle are not held against rotation, the material of which the gear 60 is formed is sufficiently stiff or rigid to provide the driving connection between the gear 60 and the cap 26 necessary to drive the vehicle wheel 14.

It is noted that the opening 44 in cap 32 has a larger diameter than sleeve 54 so that the cap does not engage or interfere with clutch element 48. In this manner, the wheel assembly, which consists of the caps 26, 32, is rotatably mounted on the shaft. In addition, the configuration of the caps is such that they fully enclose the gear 60 and the wheel assembly cannot be pulled off of the shaft. If desired, the cap 26 can have an opening 67 formed therein through which the end 69 of the bushing extends to form a simulated hub cap.

Although an illustrative embodiment of the invention has been shown with the gear element 60 as the inner clutch element and the detents 68 formed on the outer clutch element, it will be appreciated that the outer clutch element 26 can have the gear teeth 64 formed thereon and extending radially inwardly towards the shaft 22, with the detents 68 being formed on the inner clutch element 60.

Accordingly, it will be appreciated that a relatively simple clutch mechanism is provided which is adapted to protect the drive motor of the vehicle. This motor may consist of a flywheel motor of the illustrated type, or of other types, such as for example an electric battery operated, motor driving the rear wheels 14 through a gear train which also must be protected.

Although an illustrative embodiment of the present invention has been described herein with reference to the accompanying drawing, it is to be understood that the invention is not limited to that precise embodiment, and that various changes and modifications may be effected therein by one skilled in the art without departing from the scope or spirit of this invention.

What is claimed is:

1. In a toy vehicle having a plurality of ground engageable wheels and drive means having a drive shaft operatively engaged with at least one of said wheels for driving the vehicle; a clutch formed in said at least one drive wheel for protecting said drive means; said clutch comprising a first clutch element fixed to the drive shaft for rotation therewith and a second clutch element freely rotatably mounted on said drive shaft; said second clutch element having a cavity formed therein which receives and peripherally surrounds said first clutch element; one of said first and second clutch elements having a plurality of radially extending gear-type teeth formed thereon and the other of said clutch elements having at least one enlarged detent formed thereon and dimensioned to fit between two adjacent gear teeth to provide a driving connection therebetween for transmitting power from the motor to the second clutch element to drive the wheel; said gear teeth being formed of a material having a predetermined flexibility relative to said detent whereby the teeth will flex over the detent so the clutch elements can rotate with respect to one another when the driven wheel is stopped while the drive means is in operation.

2. In a toy vehicle as defined in claim 1 wherein said second clutch element comprises a cap having an inner annular surface defining said recess, said detent being formed on said inner annular surface.

3. In a toy vehicle as defined in claim 2 wherein said first clutch element comprises a circular gear having said gear-type teeth extending radially outwardly therefrom towards said inner annular surface of the second clutch element.

4. In a toy vehicle as defined in claim 3 wherein said shaft has a generally polygonal configuration and said gear has a complementary opening therein receiving said shaft in a tight fit for rotation with the shaft.

5. In a toy vehicle as defined in claim 3 wherein said inner annular surface has two diametrically opposed detents formed thereon.

6. In a toy vehicle as defined in claim 3 wherein said cap forms a part of the wheel and has a base located adjacent one side of said gear; and a second cap secured to said first mentioned cap adjacent the open end of the recess and on the other side of said gear; said second cap having an opening therein through which said drive shaft extends, whereby said gear is fully enclosed by said caps.

7. A drive wheel clutch for a toy vehicle having drive means connected to the drive wheel, said clutch comprising a first clutch element secured to the drive means for rotation thereby; and a second clutch element having an inner surface peripherally surrounding the first clutch element; one of said clutch elements having a plurality of radially extending teeth formed thereon and being formed from a flexible material; the other of said clutch elements having at least one detent formed thereon dimensioned to fit between two adjacent gear teeth to provide a driving connection therebetween for transmitting power from the motor to the second clutch element to drive the wheel.

8. A clutch as defined in claim 7 wherein said gear teeth are formed of a material having a predetermined flexibility relative to said detent whereby the teeth will flex over the detent so the clutch elements will rotate with respect to one another when the wheel is stopped, regardless of the drive direction of the drive means.

9. A clutch as defined in claim 7 wherein said detent is formed on said inner surface of the second clutch element and said teeth are formed on the first clutch element.

10. A clutch as defined in claim 8 wherein the inner surface of the second clutch element is annular and said first clutch element is a generally circular gear having said teeth formed therein; said theeth extending radially outwardly towards said inner annular surface.

11. A clutch as defined in claim 10 wherein said inner surface has two diametrically opposed detents formed thereon.

12. A clutch as defined in claim 10 wherein said second clutch element comprises a first cap having a base and an annular wall extending therefrom defining said inner surface and a recess receiving said first clutch element, said base of the second clutch element extending parallel to and on one side of the first clutch element; and a second cap secured to the annular wall of the first cap to cover the recess on the opposite side of said first clutch element, thereby to completely enclose said gear and form said wheel; said drive means including a shaft secured to said first clutch element and extending through said second cap, whereby said caps are rotatably mounted on the shaft and driven thereby through the engagement of said teeth and detent.

* * * * *